US011235467B2

(12) United States Patent
Gupta et al.

(10) Patent No.: US 11,235,467 B2
(45) Date of Patent: Feb. 1, 2022

(54) SYSTEM AND METHOD FOR TRAJECTORY PLANNING FOR MANIPULATORS IN ROBOTIC FINISHING APPLICATIONS

(71) Applicant: UNIVERSITY OF SOUTHERN CALIFORNIA, Los Angeles, CA (US)

(72) Inventors: Satyandra Gupta, Los Angeles, CA (US); Ariyan Kabir, Los Angeles, CA (US); Brual Shah, Los Angeles, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 298 days.

(21) Appl. No.: 16/391,920

(22) Filed: Apr. 23, 2019

(65) Prior Publication Data

US 2019/0321980 A1 Oct. 24, 2019

Related U.S. Application Data

(60) Provisional application No. 62/661,441, filed on Apr. 23, 2018.

(51) Int. Cl.
*B25J 9/16* (2006.01)
(52) U.S. Cl.
CPC ............. *B25J 9/1666* (2013.01); *B25J 9/163* (2013.01); *B25J 9/1664* (2013.01); *B25J 9/1669* (2013.01); *B25J 9/1692* (2013.01)

(58) Field of Classification Search
CPC ........ B25J 9/1666; B25J 9/163; B25J 9/1664; B25J 9/1692; B25J 9/1669; G05B 2219/40446; G05B 2219/40417; G05B 2219/39135; G05B 2219/40442
See application file for complete search history.

(56) References Cited

U.S. PATENT DOCUMENTS

2016/0288323 A1* 10/2016 Muhlig .................. B25J 9/1656
2019/0366543 A1* 12/2019 Butterfoss ................ B25J 9/162
2020/0376663 A1* 12/2020 Voelz ..................... B25J 9/1664

* cited by examiner

*Primary Examiner* — Basil T. Jos
(74) *Attorney, Agent, or Firm* — Snell & Wilmer LLP

(57) ABSTRACT

Methods, systems, and apparatus for automatically moving a tool attached to a robotic manipulator from a start position to a goal position. The method includes determining, using a processor, a plurality of next possible positions from the start position. The method includes selecting a second position from the plurality of next possible positions based on respective costs associated with moving the tool from the start position to each of the possible positions in the plurality of next possible positions. The method includes moving, using a plurality of actuators, the tool to the second position. The method includes determining an updated plurality of next possible positions, selecting a next position, and moving the tool to the next position until the goal position is reached.

20 Claims, 11 Drawing Sheets

| Scenario | Computation Time (in sec) | | | | Expanded States | | | | Trajectory Execution Time (in sec) | | | | |
|---|---|---|---|---|---|---|---|---|---|---|---|---|---|
| | Bi-RRT | ARA | BFS | CODES3 | %Reduction in CODES3 with BFS | Bi-RRT | ARA | BFS | CODES3 | %Reduction in CODES3 with BFS | Bi-RRT | ARA | BFS | CODES3 | %Reduction in CODES3 with BFS |
| 1a | 51.7 | 131.5 | 38.8 | 8.1 | 79.1 | 46 | 13475 | 4007 | 201 | 95.0 | 3.3 | N/S | 5.0 | 3.4 | N/S |
| 1b | 27999.0 | 90.2 | 64.3 | 5.4 | 91.5 | 31645 | 10636 | 5917 | 128 | 97.8 | 3.2 | 5.2 | 5.4 | 3.4 | 34.8 |
| 2a | 6642.7 | 18.1 | 16.6 | 5.5 | 67.2 | 1291 | 2136 | 1782 | 251 | 85.9 | 2.8 | 3.7 | 3.8 | 1.9 | 48.0 |
| 2b | 1524.0 | 15.4 | 9.8 | 9.5 | 3.1 | 434 | 1528 | 687 | 261 | 62.0 | 2.1 | 2.2 | 2.3 | 2.4 | -9.8 |
| 2c | 5539.9 | 34.7 | 27.4 | 9.0 | 67.3 | 6514 | 3380 | 2344 | 237 | 89.9 | 2.8 | 2.5 | 3.3 | 2.4 | 6.3 |
| 3a | 5053.2 | 62.5 | 29.0 | 10.6 | 63.4 | 6420 | 8132 | 2856 | 385 | 86.5 | 4.7 | N/S | 4.7 | 2.3 | N/S |
| 3b | 2.1 | 31.5 | 35.8 | 0.5 | 98.6 | 12 | 3175 | 1110 | 11 | 99.0 | 2.7 | 3.0 | 3.0 | 2.6 | 11.1 |
| 3c | 6.0 | 6.4 | 3.6 | 5.5 | -54.4 | 48 | 788 | 388 | 148 | 61.9 | 1.1 | 1.2 | 1.2 | 1.0 | 15.0 |
| 4d | 3.2 | 5.2 | 8.7 | 14.9 | -70.4 | 16 | 463 | 490 | 381 | 22.2 | 1.4 | 1.5 | 1.5 | 2.0 | -31.1 |
| 3e | N/S | N/S | 294.6 | 439.3 | -49.1 | N/S | N/S | 11752 | 8397 | 28.5 | N/S | N/S | 11.4 | 4.9 | N/S |
| 4a | 4.4 | 10.6 | 11.7 | 0.4 | 96.8 | 7 | 1636 | 1636 | 3 | 99.8 | 2.2 | 2.9 | 2.9 | 2.2 | 26.2 |
| 4b | 33.6 | 52.7 | 55.1 | 29.9 | 45.8 | 21 | 7417 | 7074 | 813 | 88.5 | 7.7 | 12.5 | 12.6 | 4.6 | 63.2 |
| 4c | N/S | N/S | N/S | N/S | N/S | N/S | N/S | N/S | 416 | N/S | N/S | N/S | N/S | 0.5 | N/S |
| 4d | N/S | N/S | N/S | N/S | N/S | N/S | N/S | N/S | 435 | N/S | N/S | N/S | N/S | 2.2 | N/S |
| 4e | N/S | N/S | N/S | N/S | N/S | N/S | N/S | N/S | N/S | N/S | N/S | N/S | N/S | N/S | N/S |
| 5a | N/S | N/S | 14065.2 | 19.1 | 99.9 | N/S | N/S | 125760 | 610 | 99.5 | 3.2 | N/S | 1.7 | 1.1 | N/S |
| 6a | 16.4 | 67.0 | 23.4 | 5.3 | 77.5 | 37 | 5575 | 2655 | 141 | 94.7 | 3.2 | 3.9 | 4.0 | 3.5 | 9.1 |

FIG. 6

| Scenario | Computation Time (in sec) | | | | States Expanded | | | | | Trajectory Execution Time (in sec) | | | | |
|---|---|---|---|---|---|---|---|---|---|---|---|---|---|---|
| | M1 | M2 | M3 | M4 | %Reduction in M4 over M1 | M1 | M2 | M3 | M4 | %Reduction in M4 over M1 | M1 | M2 | M3 | M4 | %Reduction in M4 over M1 |
| 1a | 5.7 | 5.6 | 5.5 | 8.1 | -41.7 | 201 | 201 | 201 | 201 | 0.0 | 6.2 | 6.2 | 6.2 | 3.4 | 44.9 |
| 1b | 3.6 | 3.7 | 3.5 | 4.4 | -22.6 | 128 | 128 | 128 | 128 | 0.0 | 6.2 | 6.2 | 6.2 | 3.4 | 45.6 |
| 2a | 831.9 | 4.0 | 3.9 | 5.5 | 99.3 | 24599 | 251 | 251 | 251 | 99.0 | 18.8 | 3.8 | 3.8 | 1.9 | 48.6 |
| 2b | 109.7 | 10.8 | 7.6 | 9.5 | 91.4 | 2902 | 350 | 261 | 261 | 91.0 | 4.9 | 3.7 | 3.4 | 2.4 | 30.2 |
| 2c | 8.8 | 7.2 | 7.0 | 8.9 | -0.6 | 251 | 237 | 237 | 237 | 5.6 | 3.9 | 3.9 | 3.9 | 2.4 | 38.3 |
| 3a | 262.5 | 11.6 | 7.6 | 10.6 | 96.0 | 7216 | 502 | 385 | 385 | 94.7 | 10.0 | 5.6 | 4.5 | 2.3 | 49.2 |
| 3b | 0.4 | 0.4 | 0.4 | 0.5 | -5.3 | 11 | 11 | 11 | 11 | 0.0 | 2.7 | 2.7 | 2.7 | 2.6 | 1.3 |
| 3c | 75.1 | 10.9 | 4.3 | 5.5 | 92.7 | 2065 | 313 | 148 | 148 | 92.8 | 2.9 | 2.0 | 1.8 | 0.9 | 49.8 |
| 4d | 2924.0 | 20.0 | 11.8 | 14.9 | 99.5 | 65312 | 580 | 381 | 381 | 99.4 | 9.4 | 4.0 | 4.1 | 1.9 | 54.0 |
| 3e | 2420.9 | 1985.7 | 365.1 | 439.3 | 81.9 | 49280 | 49602 | 8397 | 8397 | 83.0 | 9.7 | 10.4 | 7.2 | 4.9 | 31.3 |
| 4a | 0.3 | 0.3 | 0.3 | 0.4 | -10.5 | 3 | 3 | 3 | 3 | 0.0 | 2.5 | 2.5 | 2.5 | 2.2 | 12.7 |
| 4b | N/S | 10.3 | 10.5 | 29.9 | N/S | N/S | 813 | 813 | 813 | N/S | 14.2 | 13.4 | 13.4 | 4.6 | 65.8 |
| 4c | 295.5 | 15.6 | 14.2 | 17.8 | 94.0 | 1514 | 426 | 416 | 416 | 72.5 | 1.3 | 1.3 | 1.9 | 0.5 | 73.4 |
| 4d | 20.2 | 15.8 | 15.8 | 19.6 | 3.4 | 462 | 435 | 435 | 435 | 5.8 | 10.8 | 4.2 | 4.2 | 2.2 | 46.7 |
| 4e | N/S | N/S | N/S | N/S | N/S | N/S | N/S | N/S | N/S | N/S | N/S | N/S | N/S | N/S | N/S |
| 5a | N/S | 14.0 | 14.8 | 19.1 | N/S | N/S | 610 | 610 | 610 | N/S | N/S | 2.7 | 2.7 | 1.1 | N/S |
| 6a | 310.2 | 3.6 | 4.2 | 5.3 | 98.6 | 6489 | 122 | 141 | 141 | 97.8 | 3.8 | 4.4 | 4.6 | 3.5 | 23.4 |

FIG. 7

| Scenario | Computation Time (in sec) | | Trajectory Execution Time | |
|---|---|---|---|---|
| | BFS | CODES3 | BFS | CODES3 |
| 3e | 20.9 | 12.2 | 5.3 | 3.5 |
| 4e | 2084.8 | 104.5 | 12.5 | 7.0 |

FIG. 8

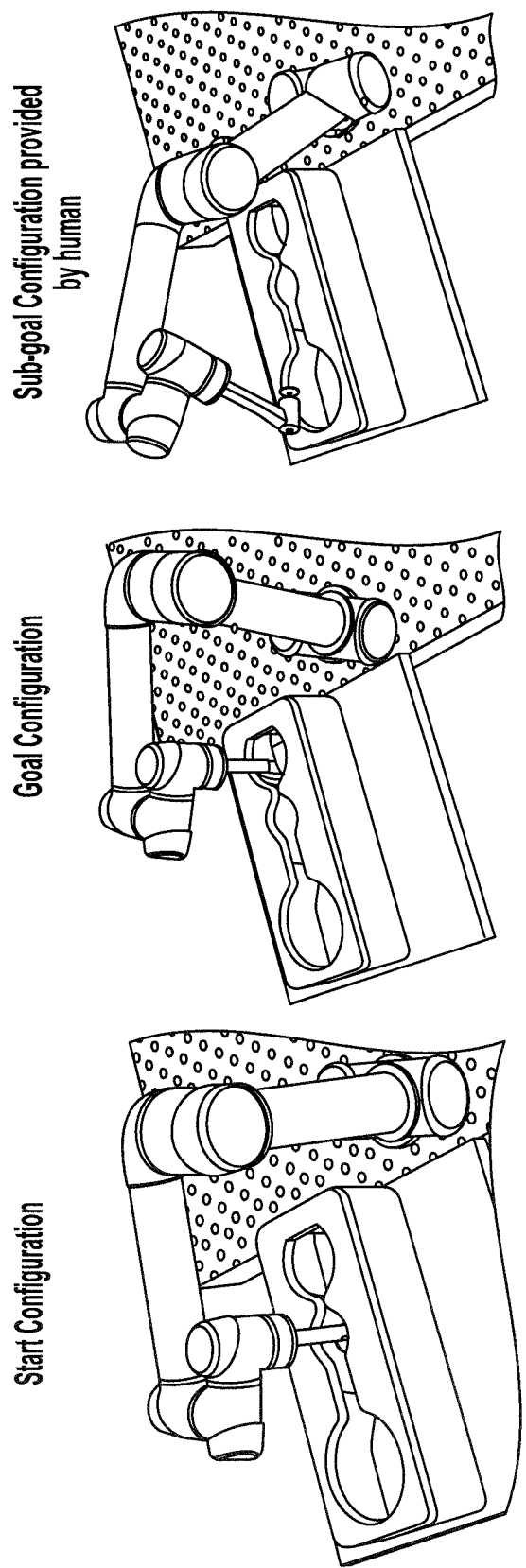

SYSTEM AND METHOD FOR TRAJECTORY PLANNING FOR MANIPULATORS IN ROBOTIC FINISHING APPLICATIONS

CROSS REFERENCE TO RELATED APPLICATIONS

This application claims the benefit and priority of U.S. Provisional Application Ser. No. 62/661,441, filed Apr. 23, 2018, entitled "Setup Planning, Trajectory Planning and Parameter Selection for Robotic Finishing," the contents of which are herein incorporated by reference in its entirety.

GOVERNMENT LICENSE RIGHTS

This invention was made with United States government support under Contract No. 1634431 awarded by the National Science Foundation. The United States government has certain rights in this invention.

BACKGROUND

1. Field

This specification relates to systems and methods for automatically moving a tool using a robotic manipulator.

2. Description of the Related Art

Many manufacturing applications, such as robotic finishing, require robotic manipulator(s) to operate in a common workspace on same (or different) workpiece(s). During the operation, each manipulator considers the current state of the workspace and plans a collision-free trajectory in order to accomplish its desired task. Traditionally, the motions of the robotic manipulators were predefined and programmed by the expert human operator while deploying these manipulators on mass production lines. In case of any error in the operating environment, the whole process (or assembly line) was suspended into a standby mode before resolving the errors. This procedure causes large delays and leaves very small margin of error.

The National Association of Manufacturers estimates that the US has close to 300,000 small and medium manufacturers (SMMs), representing a very important segment of the manufacturing sector. Small volume production, which represents a significant segment of SMM, uses highly automated processes to convert raw material into individual parts. Examples include 3D printing, CNC machining, laser cutting, injection molding, etc. The remaining operations are largely manual and often labor intensive. Examples include machine loading/unloading, inspection, cleaning, and assembly. In contrast, these manual operations are often performed by robotic manipulators on mass production lines. This clearly shows the potential of robotic manipulators in manufacturing. However, current generation of robotic manipulators are not considered useful in small production volume operations due to long programming time, and low reusability. Hence, SMMs in the US have largely stayed away from using them.

The trajectories for manipulator(s) need to be generated in real-time in dynamic environments. Generating collision-free, time-optimal, and/or energy-optimal trajectories was conventionally computationally infeasible. This is due to the large degree-of-freedom (DOF) of the manipulator(s). The state-of-the-art trajectory planners that can generate solution in real-time are stochastic in nature. This often leads to undesirable and redundant motions and the trajectories are neither time nor energy optimal. Currently, none of the high-volume manufacturing systems involving robotic manipulators use any trajectory planners. Instead, each manipulator operates on predefined motions programmed by the expert human operator, which takes significant time. Thus, eliminating the use of robotic manipulators in SMMs. Therefore, there is a need for improved systems and methods of trajectory planning.

SUMMARY

What is described is a method for automatically moving a tool attached to a robotic manipulator from a start position to a goal position. The method includes determining, using a processor, a plurality of next possible positions from the start position. The method also includes selecting, using the processor, a second position from the plurality of next possible positions based on respective costs associated with moving the tool from the start position to each of the possible positions in the plurality of next possible positions. The method also includes moving, using a plurality of actuators, the tool to the second position. The method also includes determining, using the processor, an updated plurality of next possible positions, selecting a next position from the updated plurality of next possible positions based on respective costs associated with moving the tool from the start position to each of the possible positions in the updated plurality of next possible positions, and moving the tool to the next position until the goal position is reached.

Also described is a system for automatically moving a tool attached to a robotic manipulator from a start position to a goal position. The system includes a processor. The processor is configured to determine a plurality of next possible positions from the start position. The processor is also configured to select a second position from the plurality of next possible positions based on respective costs associated with moving the tool from the start position to each of the possible positions in the plurality of next possible positions. The processor is also configured to determine an updated plurality of next possible positions and select a next position from the updated plurality of next possible positions based on respective costs associated with moving the tool from the start position to each of the possible positions in the updated plurality of next possible positions until the goal position is reached. The system also includes a plurality of actuators configured to move the tool to the second position, the next position, or the goal position.

Also described is a method for automatically moving a tool attached to a robotic manipulator from a start position to a goal position. The method includes determining, using a processor, a plurality of next possible positions from the start position using a motion primitive, the motion primitive chosen from a plurality of possible motion primitives based on a freedom of motion of the robotic manipulator. The method also includes selecting, using the processor, a second position from the plurality of next possible positions based on respective costs associated with moving the tool from the start position to each of the possible positions in the plurality of next possible positions. The method also includes moving, using a plurality of actuators, the tool to the second position. The method also includes determining, using the processor, an updated plurality of next possible positions, selecting a next position from the updated plurality of next possible positions based on respective costs associated with moving the tool from the start position to each of the possible positions in the updated plurality of next possible positions, and moving the tool to the next position until the goal position is reached.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

FIG. 6 shows the comparisons among the methods in computation time, node expansion, and trajectory execution time, according to various embodiments of the invention.

FIG. 7 shows the comparison of performance on the test parts by activating/deactivating different features of the algorithm, according to various embodiments of the invention.

FIG. 8 shows the computation time and trajectory execution time for BFS and CODES3 with human input, according to various embodiments of the invention.

FIGS. 9A-9C show the start, goal, and intermediate configuration of the robot for scenario 4e in the experiment, according to various embodiments of the invention.

DETAILED DESCRIPTION

Figure 1A:
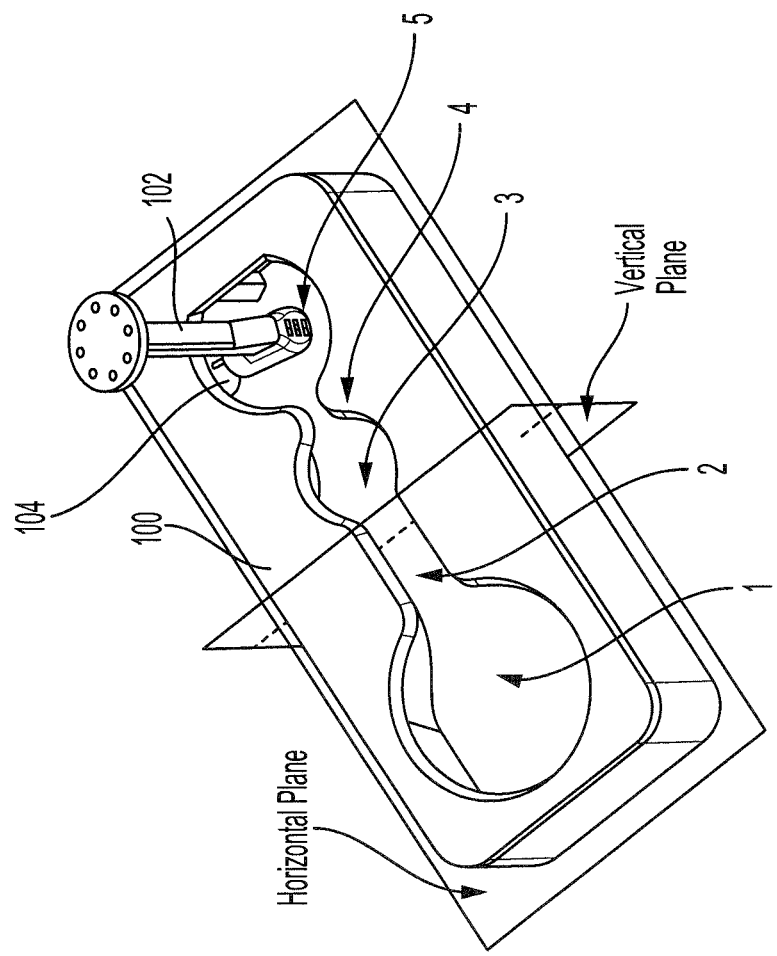
FIGS. 1A-1E illustrate a part, a robotic manipulator, and a tool, according to various embodiments of the invention.
Figure 1B:
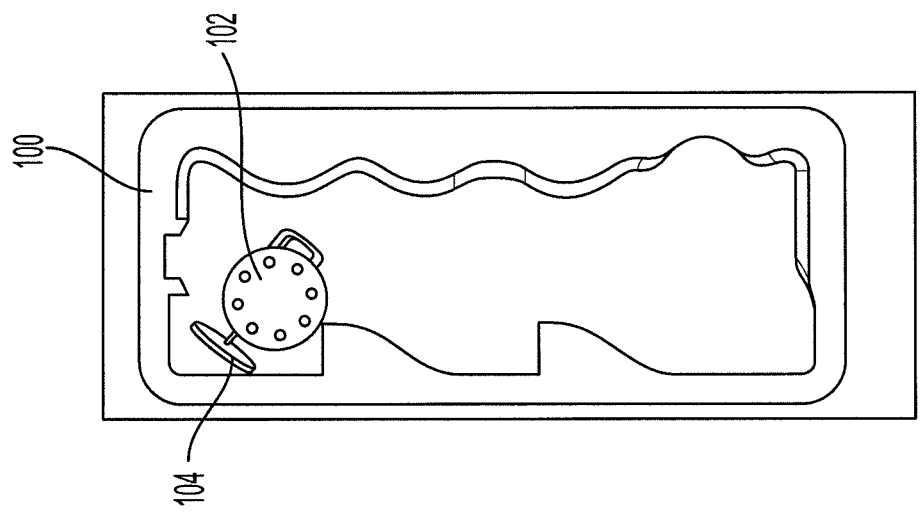
Figure 1C:
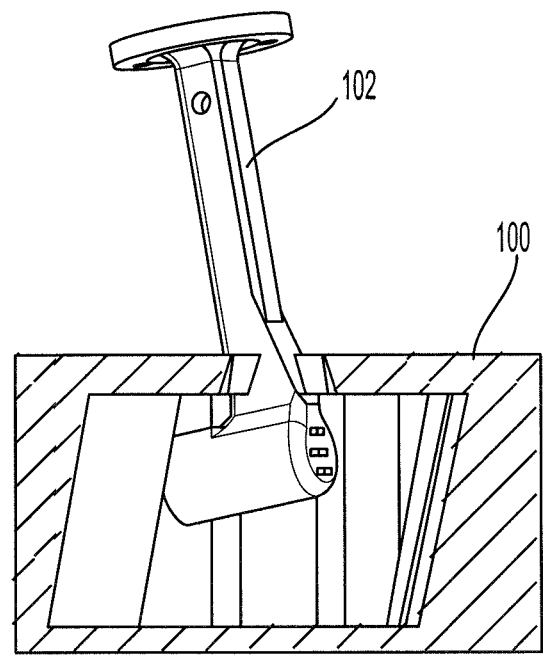
Figure 1D:
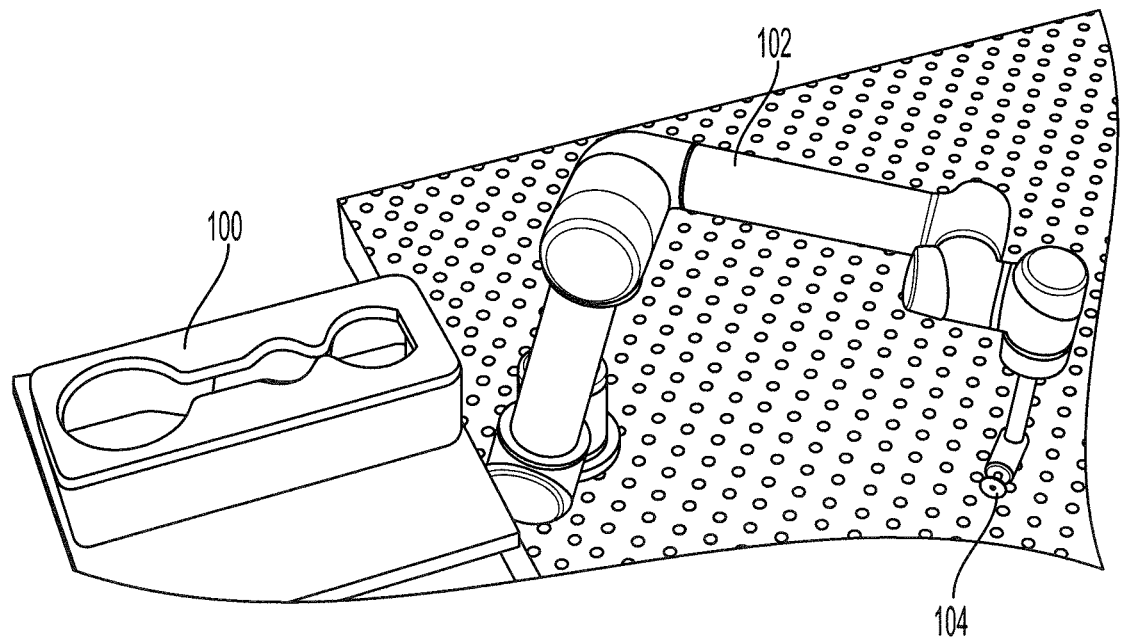
Figure 1E:
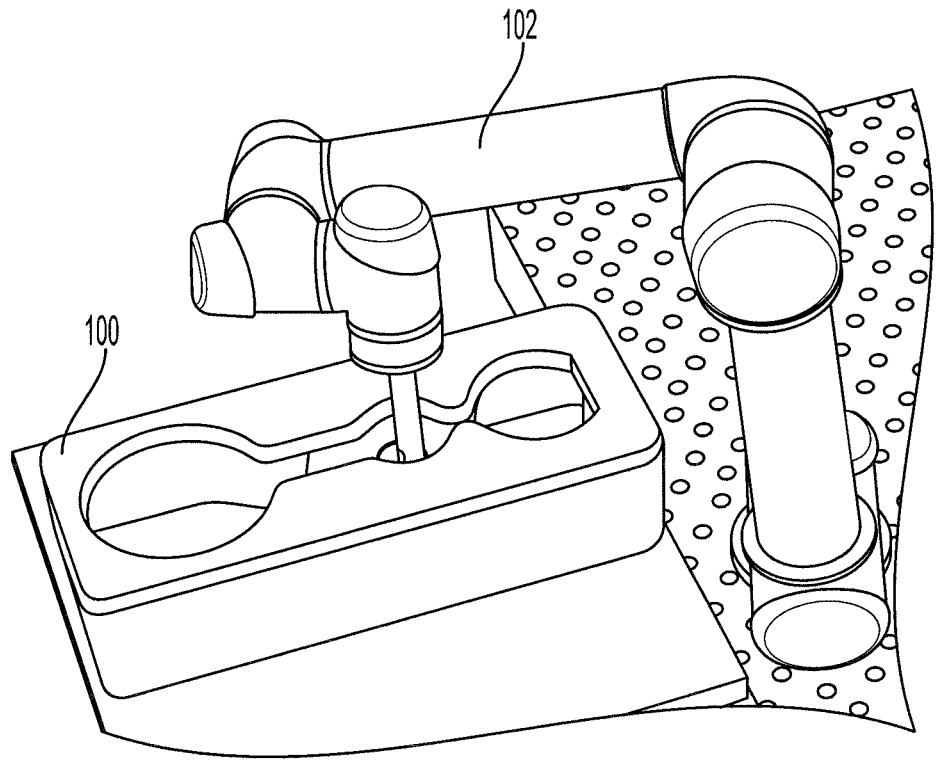

The novelty of the systems and methods described herein is an anytime graph search-based trajectory planning algorithm that computes collision free trajectories for the high DOF manipulation system consisting of one or more robotic manipulators in real-time. Several enhancements have been developed for the planner that improves the computational efficiency of the planner and enables it to compute plans in real-time.

The workspace analysis described herein enables the planning algorithm to efficiently compute the forward kinematic solution in constant time and is independent of the DOF of the manipulation system. The improved collision detection approach described herein reduces the time required to evaluating the collision between during the search and sampling of configuration space.

The computational performance of the planning algorithm is improved by automating context dependent dynamic switching of heuristic functions to efficiently guide the search towards the goal state, automating switching and scaling of control action primitives by estimating the congestion around each state, and reducing the number of nodes expanded by automated elimination of nodes using the diversity criteria.

The sampling-based routine described herein samples in the configuration space of the robot and approximates the available free-space. This routine takes the queries from the graph search planning algorithm and performs PCA analysis in the configuration space and workspace. The stochastic optimization-based trajectory completion described herein allows the planner to complete the trajectory to the goal configuration by one-step evaluation, thus reducing the number of nodes expanded.

There may be three broad categories of manipulator trajectories. First, the robot may move from one joint configuration to another (e.g., pick and place operations). Second, the robot may approach and make contact with an object or surface patch (e.g., assembly). The object location may have uncertainty associated with it. Third, the robot may execute task-constrained trajectories by staying in contact with a surface (e.g., cleaning, polishing).

The systems and methods described herein solve the first kind of trajectory planning problem for manipulators. For these kinds of trajectories, the robot will avoid all unwanted contacts and collisions. However, the workspace of the robot can be highly constrained with geometrically-complex obstacles, which in turn makes the trajectory planning problem very challenging.

FIGS. 1A-1E illustrate a representative example of an object (or "part") that the robot determines a trajectory to. In the example, a six degrees of freedom (DOF) manipulator (or "robot") 102 with a tool 104 attached is supposed to move from the initial configuration (shown in FIG. 1D) relative to the object 100 to the final configuration (shown in FIG. 1E) to finish the internal surfaces of the part 100 (shown in FIG. 1A). The part geometry creates a very constrained workspace for the manipulator 102 to guide the tool 104 inside the object 100.

Five possible entry regions for the tool 104 are marked in FIG. 1A. Due to tool and part dimensional constraints, only region 1 and 5 can be used as valid insertion regions. Regions 2, 3, and 4 are too narrow to be valid insertion regions. Moreover, no internal maneuver of the tool is possible through region 4. If the robot 102 inserts the tool 104 through region 5, then it cannot reach region 3 by moving the tool 104 internally through region 4. The robot 102 can take the tool 104 to region 3 only by inserting it through region 1 and moving it through region 2. The complex internal geometry (shown in FIGS. 1B and 1C) highly constrains the maneuvers possible by the robot 102.

The trajectory planning systems and methods described herein are capable of planning trajectories for higher dimensional manufacturing systems involving single or multiple manipulators. As described herein, higher dimensional systems are those with manipulators having 10 or more (e.g., 10-14) degrees-of-freedom (DOF). The trajectory planner for these higher dimensional systems requires the following components: (a) an efficient kinematics solver to analyze the reachability of the end-effector in the workspace, (b) an accurate and computationally efficient collision detection algorithm, and (c) a trajectory planning algorithm that effectively partitions the workspace and computes plans in real-time.

The planning systems and methods described herein generate a robot trajectory that can be executed in a time-optimal manner. However, search-based trajectory planning for manipulators with time optimal execution cost can be intractable. Most applications with non-repetitive tasks require fast computation of near-optimal, feasible trajectories. The use of multiple different heuristics and adaptive primitives can improve search performance in manipulator planning applications. However, the understanding of the contexts is important in designing the appropriate heuristics and primitives. An algorithm used by the systems described herein may be referred to as a COntext DEpendent Search Strategy Switching (CODES3) algorithm. The algorithm presents (1) context-dependent search strategies for searching different regions of the search space efficiently for manipulators operating in confined workspaces and (2) context identification based on the neighborhood analysis of the state space. This enables switching of search strategies depending upon the context to improve search performance.

The approaches used for higher dimensional systems can broadly be classified into three categories: (a) Graph search-based methods, (b) Sampling-based methods, and (c) Stochastic optimization-based methods.

Graph search-based planners for manipulators typically do not have an explicit structure of the graph. These planners use control action primitives to travel from one state to another and dynamically compute state-lattice structures during the search. These approaches are deterministic and compute optimal trajectories. However, the computation time required to compute optimal trajectories is significant. The computation time and optimality of the trajectory rely on selection of number of control action primitives, length (i.e., distance or time) of each primitive, and heuristic used during the search. The number of control primitives used during the search may be varied by exploiting the knowledge about the workspace. For example; a sparse primitive set containing motions of only few of the joints (or reduced DOF) may be used through large portions of the workspace and a dense primitive set (or complete DOF) may be used when the goal state is approached. In another example, a fast-to-compute heuristic may be used to improve the search that reduces the computational time. However, conventional planners have primitives that only control one joint (or DOF) at a time, and do not concurrently control all the available joints (or DOF). In order to utilize all the DOFs of high dimensional manipulators, the planner described herein concurrently controls multiple joints while computing the collision free trajectory.

Sampling-based motion planners used for manipulators primarily involve Rapidlyexploring Random Trees (RRT), Probabilistic Roadmap (PRM), and its variants. These planners randomly sample the configuration space of the manipulator and attempts to make connections between two (or more) samples. The planners vary in the method or distribution used for sampling and the heuristic used for effectively making the connections between sampled configurations. For example, a sampling-based planner may simultaneously expand two concurrent RRT trees—one from the start configuration and the other from the end configuration. The sampling of each tree is biased toward the closest configuration of the other tree. This enables the trees to grow toward each other and find a configuration that combines both the trees. These class of planners are effective in computing trajectories in higher dimension spaces. However, most of the trajectories computed by these planners are stochastic in nature and lack consistency (i.e., the trajectory connecting two configurations will be different for each planning cycle).

Optimization-based approaches include CHOMP, STOMP, and their variants. These set of planners are capable of generating trajectories in high dimensional spaces with low computational time when provided with an initial seed trajectory. The success of these planners drastically depends on the provided initial trajectory. Typically, the initial trajectory is composed of set of discrete, linearly interpolated segments between start and goal configurations. This initial seed works well if the workspace is populated with sparse and convex obstacles. However, in scenarios with dense and non-convex obstacle fields, trajectories from sampling-based planners like RRT are provided as the initial seed, which is further optimized by this class of planners. The quality of the trajectory indirectly depends on the quality of the trajectory computed by RRT and lacks consistency.

Problem Formulation

Let $\Theta=\{\theta_1, \theta_2, \ldots, \theta_n\}$ be the joint configuration of a serial link manipulator with n joints. Each joint is bounded within its specific range ($\theta_i^{min} \leq \theta_i^{min} \leq \theta_i^{max}$). C is the configuration space of the robot 102 which contains all possible joint angle combinations of the robot 102. Therefore, $C = \cup \Theta$, for all possible $\Theta$.

Let W be a subset of 3D Euclidean space, and the robot's workspace is contained in W. Each link of the robot 102 is modeled as a rigid solid. The robot 102 is represented at configuration $\Theta$ as a collection of rigid solids $R(\Theta) \subset W$. The geometric, kinematic, and dynamic models (M) of the robot are well defined and available. Let $O \subset W$ be the set of obstacles in the robot's workspace. The set of joint configurations that lead to collision is represented as Cobs (obstacle space). Therefore, $C_{obs}=\{\Theta \in C : R(\Theta) \cap \mathcal{O} \neq \emptyset\}$. Let $C_{free}$ represent the collision-free configuration space, i.e., $C_{free}=\{\Theta \in C : R(\Theta) \cap \mathcal{O} = \emptyset\}$.

Let T be the homogeneous transformation matrix representing the pose (position and orientation) of the robot's end-effector in W. For a given joint configuration $\Theta$, T may be determined by applying forward kinematics (FK). Similarly, given an end-effector's pose, the joint configuration may be determined by computing inverse kinematics (IK).

The systems and methods described herein are used to address the trajectory planning problem of the manipulator 102 where the robot 102 needs to move from one configuration to another in the configuration space. Let the start and goal configurations of the trajectory be $\Theta_{start}$ and $\Theta_{goal}$, respectively ($\Theta_{start}, \Theta_{goal} \in C_{free}$).

$\Theta_G$ is defined as a set of acceptable goal configurations for the trajectory in the neighborhood around $\Theta_{goal}$. $\Theta_G = \{\tilde{\Theta}_{goal} \in C_{free} : \|\tilde{\Theta}_{goal} - \Theta_{goal}\| < \varepsilon\}$.

Let P(s) be a feasible path (collision-free and continuous) in the configuration space parameterized by $s \in [0, 1]$. $P(0)=\Theta_{start}$ and $P(1) \in \Theta_G$. P(s) may be converted into a trajectory $\tau(s)$ by assigning joint velocities for the robot in configuration space. The systems and methods described herein aim to minimize the trajectory execution time. Therefore, between two waypoints on P(s), maximum joint velocity may be assigned to the joint that needs to go through maximum displacement. Appropriate velocities may be assigned to the rest of the joints such that all the joints start and finish their motion at the same time.

Collision-free and continuous trajectories may be considered as feasible trajectories. Let T be the set of all feasible trajectories from $\Theta_{start}$ to $\Theta_{goal}$. Let $L(\tau):\tau \to (0, \infty)$ be the cost of a trajectory $\tau$. $L(\tau)=\infty$ corresponds to infeasible trajectories. Therefore, the optimal trajectory to move from $\Theta_{start}$ to $\Theta_{goal}$ will be, $\tau^* = \mathrm{argmin}_{\tau \in T} L(\tau)$.

Given a robot model (M), workspace obstacles ($O \subset W$), start and end configurations ($\Theta_{start}, \Theta_{goal}$), an acceptable boundary around the end configuration ($\varepsilon$), and computation time bound ($t_{max}$), the objective of the system is to device a branch and bound heuristic search algorithm to find a near-optimal trajectory, $\tilde{\tau}^* \in T$.

Approach

Planning Algorithm Overview

Trajectory planning problems are PSPACE-hard and it is computationally intractable to generate an optimal solution for the problems in high dimensional search spaces. The computational efficiency and the quality of the computed trajectory depend on the branching factor and the depth of the search tree. In systems and methods described herein, the branch and bound heuristic search has been adapted to find near-optimal solution to the trajectory planning problem.

The branching factor of the tree is directly proportional to the number of available motion primitives used during the expansion of each node. Moreover, it is inefficient to use the same set of primitives in the complete workspace around the robot. The algorithm described herein uses a list of distinct set of motion primitives and switches between them depending upon the estimated configuration space obstacle and the progress of the search. On the other hand, the depth of the tree is dependent upon the length of the motion primitives. Accordingly, the algorithm varies the length of the primitives depending upon the estimate of the configuration space obstacles around each expanded node. Further, the set of motion primitives that moves one joint at a time increases the depth of the search tree and the execution time. A backtracking feature combines the motion of several nodes that reduces the trajectory execution time.

The computational efficiency of the search relies on the selection of promising nodes that are used to expand the frontier of the search tree towards the goal. The selection of the promising nodes of the search tree relies on the heuristics used during the search. Well-designed search guiding heuristics are used to solve the problem in a computationally-efficient manner. If a heuristic reflects the true cost (or cost-to-go) to reach the goal from a node, then it correlates to the promise that the node will be lying on the trajectory leading towards the goal. A heuristic may start misleading the search when the correlation is lost. A guiding heuristic that does not take search context into account may not work well throughout the entire search space. However, different guiding heuristics can be designed that can perform well in different regions of the space.

An efficient algorithm switches heuristics to perform well in different regions. The algorithm described herein makes informed decisions to switch between these guiding heuristics. This algorithm is called COntext DEpendent Search Strategy Switching (CODES3). It makes the decision based on progress of the search and the estimate of obstacles in the configuration space. Finally, in the scenario where designed heuristic functions are not able to guide the search, the human operator can provide a subgoal to the search problem and divide the search in segments. The available heuristics may work well for the subsegments and accelerate the overall search. This is often beneficial in practical applications where a feasible and fast solution is desired over cost-optimal but computation time-inefficient solutions.

During the search, the nodes expanded in the complex and confined configuration spaces may have marginally different cost. The search algorithm will invest a large amount of computational resources evaluating all of these nodes with marginal improvement in the progress of the search tree. The progress of the search and the estimated free configuration space are dynamically measured to select nodes that are diverse in nature. The diversity of a node can help the search algorithm to prune branches and direct the resources towards the nodes that improves the progress of the search towards to goal.

Figure 2:
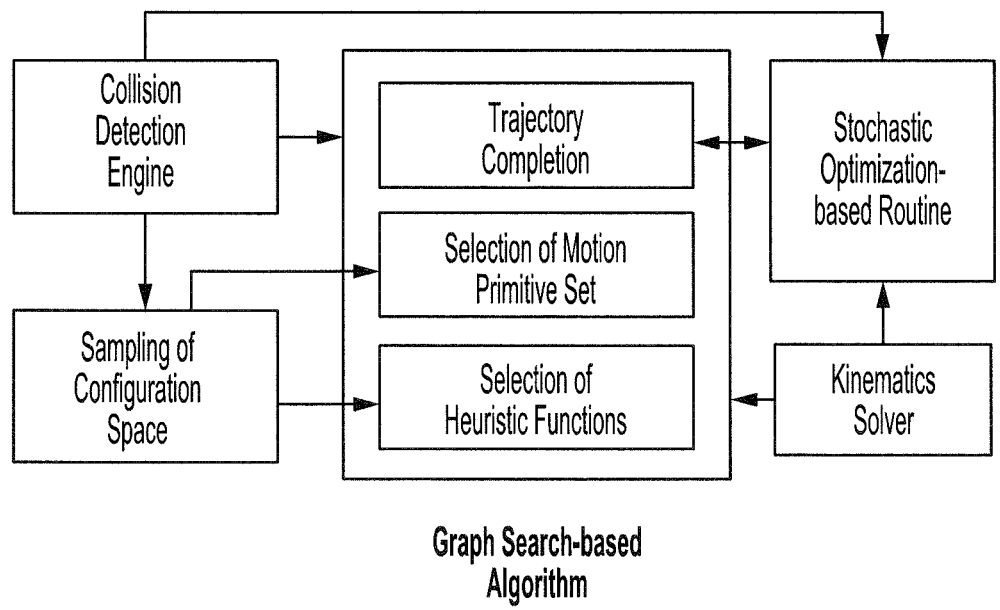
FIG. 2 illustrates the interaction between the collision detection engine, the sampling of configuration space, the kinematics solver, and the optimizer with the planning algorithm, according to various embodiments of the invention.

FIG. 2 illustrates the interaction between the collision detection engine, the sampling of configuration space, the kinematics solver, and the optimizer with the planning algorithm.

Workspace Analysis

Each robotic manipulator 102 has a workspace that is defined by its kinematic constraints. It is not possible for the manipulator 102 to reach any point of the workspace at any possible orientation. A manipulator 102 may often have multiple joint space (or "configuration space") solutions for a specified point or pose (pose, $p \in SE(3)$) in its workspace. For manipulators with 6 or less DOF, the equations for inverse kinematics may be analytically derived. However, manipulators with 7 or more DOF are kinematically redundant manipulators. They have infinite configuration space solution corresponding to a pose in workspace. Numerical methods exist for solving inverse kinematics for 7 or more DOF. Analytical methods can also be derived by constraining a subset of the manipulator joints. However, it becomes computationally expensive to solve inverse kinematics online for redundant manipulators. The workspace analysis becomes more difficult with a multi-robot setup with 10+ DOF.

To solve inverse kinematics online, the workspace of each manipulator is analyzed and a look up table is stored. The workspace may be represented as a voxel grid. A cell of the voxel grid is marked as reachable if it is reachable by position and with a range of orientation. The voxel grid is populated using the analytical closed form equation of forward kinematics. Swept volume computation is adapted in the disclosed algorithm for generating the workspace. Therefore, the continuity information in the joint space to move from one voxel grid to its neighbor is known. Once the workspace is represented as a voxel grid, the inverse kinematics solution may be polled through a single query. Once the workspace representation for different manipulators is obtained, the optimal shared workspace among them may be analytically determined based on the application.

Collision Detection

The most commonly used collision detection approaches include the signed Euclidean Distance Transform (EDT) and the Flexible Collision Detection library. The signed EDT takes a boolean voxel representation of the environment as an input and produces a 3D distance D representation of the environment. Each cell in D provides information about the distance to the boundary of the closest obstacle. A positive value of the cell indicates that it lies outside the obstacle, a negative value indicates that it lies inside the obstacle, and a zero value represents the obstacle boundary. It is assumed that the boolean voxel representation will be provided either in the form of point cloud data and/or from a triangular mesh model. On the other hand, the FCL library preforms efficient collision checking between two triangular mesh objects.

During motion, the manipulator 102 should avoid static regions, such as the workbench or structural beams, as well as dynamic regions, such as adjacent moving manipulators, moving ground vehicles (e.g. forklift), or parts on a moving conveyor, for example. The computation of signed EDT takes several milliseconds and it is not efficient to compute the EDT for every minor change in the environment. However, once computed EDT provides a constant lookup for all the colliding objects, which takes insignificant amount of computational time. On the other hand, FCL takes a constant time of the order of micro-seconds for each collision query. The use of signed EDT and FCL have been combined herein to perform collision checking.

The collision checking with static regions of the workspace, which do not vary over time, is performed using signed EDT. The collision with respect to dynamic objects and the self-collision between the manipulators (when the system contains more than one manipulator robot) are performed using FCL.

Configuration Space Sampling

In the developed approach, the configuration space is randomly sampled to approximate the available free-space. During the sampling, all the colliding and non-colliding configurations are kept track of and an approximate model of the configuration space obstacles is built. The sampling of the configurations is non-uniform and balances the exploration vs exploitation paradigm. When a sample in the configuration space results in the collision with a workspace obstacle, the configurations that needs to be sampled in the neighborhood of the colliding sample are adaptively selected in order to approximate the envelop of the workspace obstacles in the configuration space. The sampling of the configuration space is a constant process operating in parallel with the graph-search algorithm. This enables the algorithm to keep on improving its approximation of the configuration space obstacles without interrupting the graph-search.

The search algorithm adaptively varies the time scaling $\delta t$ for each control primitive $P^c \in MP$ at the current node $n_{curr}$. During the search, the sensitivity may be estimated at each dimension of the configuration space given the estimated model of the configuration space obstacles. In other words, as used herein, sensitivity refers to how much each joint of the manipulator may be varied in order to encounter collision. However, the collisions in each joint are dependent upon the amount of collision free motions performed by the lower joints (or joints towards the base of the manipulator). An approach has been developed that combines the random sampling and gradient descent. Initially, a set of configurations containing extreme values of the joints is considered. These configurations are evaluated for collisions and performed gradient descent, as long as they do not encounter any collision. The gradient descent tries to maximize the deviation from the configuration of the robot at the current state s. The configurations that encounter collisions are removed and new samples are added by reducing the extreme values of the joints. Finally, the sensitivities of each joint are determined. Further, the sensitivity of each joint is dependent upon the existing model of the configuration obstacle and is probabilistic. Thus, the sensitivity of each joint is nothing but expected sensitivity. The knowledge of this expected sensitivity is used for deciding the scaling factor $\delta t$ for control primitives $P^c \in MP$ at the current node $n_{curr}$. Also, all the newly encountered collisions are used to update the model of the configuration space obstacles.

Stochastic Optimization-Based Trajectory Completion

During the search, many approaches attempt to directly achieve the goal configuration. In order to successfully determine that the motion from the current node n to the goal node $n_{goal}$ is collision free, the configuration between n and $n_{goal}$ is broken down into series of linearly interpolated configurations, and each configuration is checked for collision. This process is computationally expensive and cannot not be performed for every node during the search. Sampling-based algorithms, such as RRT, sample the goal state configuration with some low probability $p_\varepsilon$ to attempt direct connection of the goal configuration with the goal state. On the other hand, graph search-based approaches attempt to achieve goal configuration for all the expanded nodes that lie within a sphere of some radius $r_\varepsilon$ to the goal pose in the workspace. These techniques either report success or failure in reaching the goal. However, none of them attempt to marginally modify the path during its collision evaluation to overcome the obstacles without expanding more nodes.

Similar to most of the approaches, the approach described herein also breaks down the configuration between n and $n_{goal}$ into series of linearly interpolated configurations and checks each configuration for collision. However, in the scenario where the collision(s) is encountered, the algorithm described herein tries to modify the intermediate configuration between n and $n_{goal}$ to mitigate these collision(s).

During the search, the algorithm described herein decides the right nodes at which the attempt to reach the goal configuration will be successful. For example; the chances of reaching to the goal state directly from start node is quite small as compared to the nodes that are close to goal state. In order to find the right set of nodes that will maximize the chances of reaching the goal, Monte Carlo simulations are performed before the online search that varies: (a) the number of samples used to compute the configuration space obstacles, (b) the number of collisions with the linearly interpolated trajectory segments, and (c) the local congestion around the current node n. The local congestion around the node n is computed by evaluating the ratio of the number of colliding samples to the number of total samples lying inside $\pm \theta_\varepsilon$ for each joint. The Monte Carlo simulations determine the probability of success to reach the goal configurations. This probability is used to determine that the current node n should be evaluated for direct connection to the goal state.

Planning Algorithm

The state space used for search includes a discrete version of the continuous configuration space C, denoted by $C_d$. Each state in the state space consists of a discrete joint configuration of a serial link manipulator with n joint values denoted by $\Theta_d = \{\theta_{d,1}, \ldots, \theta_{d,n}\} \in C_d$. The graph used for the search consists of nodes that correspond to discrete states in $C_d$, and each node is denoted by n. The nodes corresponding to the start $\Theta_{start}$ and goal $\Theta_{goal}$ states are represented by $n_{start}$ and $n_{goal}$ respectively. The transition between the current node $n_{curr}$ to child node $n_{child}$ in the graph is achieved by a set of motion primitives $P(n_{curr}) \in MP$, where MP is the list of all motion primitive sets.

The search initiates by considering the start state $\Theta_{start}$ as the primary node $n_{start}$. As described herein, each state corresponds to each node in the search tree. The children of the primary node are computed using the set of control primitives $P(n_{start}) \in MP$. The next node is selected based upon a cost function $f(n) = w_g g(n) + w_h h(n)$, where $g(n)$ is the cost-to-come from the start node $n_{start}$ to the current node n and $h(n)$ is the dynamic heuristic functions for the selection of promising nodes to guide the search towards the goal node $n_{goal}$. The weights $w_g$ and $w_h$ are used to balance the quality of the computed path versus the computation time required by the planner to generate trajectories. For example, with $w_g=1$ and $w_h=0$ the planner will compute the resolution optimal trajectories, however the computational time required by the planner will be large. On the other hand, with $w_g=0$ and $w_h=1$ the planner will focus on generating trajectories as fast as possible.

The heuristic functions used for the selection of promising nodes to guide the search is given by $h(n) = w_1 k^c(n) + w_2 k^w(n) + w_2 l(n)$. The functions $k^c(n)$, and $k^w(n)$ are the guiding heuristics in configuration space, and workspace, respectively.

Finally, the function $l(n)$ is termed as the diversity function, which is used to evaluate the change in the robot configuration (or state) with respect to previously expanded nodes during the search. This cost is dynamically varied as the search progresses. The cost function used to evaluate the quality of the solution is given by g(n), where g(n) is the cost-to-come to node n from the start node $n_{start}$.

The approach is presented in Alg. 1. Line 1 states the initialization routine that initializes all the data structures and flags. The function SelectGH in Line 3 is used to select an appropriate heuristic function that can be used by the search. Line 4 of the algorithm uses a function GetNextBestNode that uses the history of nodes and evaluates the diversity condition to get the next best node for the provided heuristic cost function $GH_{gh\_id}$. Lines 10-14 is used to ensure that each node is expanded just once. Line 15 gets the collision data around the current node from the Sampling Routine that is running parallel to the search. Lines 16-17 selects the appropriate motion primitive set that will be used to determine children for the current node. Line 22 includes a function GetParentByBT that iterates through the previous n nodes in the search from the current node and gets the best new parent for the child node. Lines 24-27 computes the heuristic value using all the defined heuristic functions and pushes the child node in the priority queue using an appropriate cost function. Lines 29-33 determine the need for human input, invoke a function that will reset all the data structures, and start two new instances of Alg. 1 with modified start and goal using an intermediate configuration provided by the human.

Heuristic Function

The graph search-based algorithm uses a heuristic function to approximate the cost-to-go from the current node to the goal node in configuration space. However, that may not be sufficient to guide the search in the complex workspace environment. This is primarily due to the fact that complete knowledge of the configuration space obstacles is not known, especially for the robots with high DOF. Therefore, several new heuristic functions are introduced that will help to guide the search in conjunction with the traditional heuristic function $k^c(n)$ in configuration space. The new guiding function $k^w(n)$ that is introduced as a part of the heuristic function h(n) will approximate the search progress in the workspace. Also, $k^w(n)$ can leverage the complete knowledge of the workspace obstacles and navigate the search in the regions that may be closer to the workspace representation of the goal configuration.

Let the 6D workspace representation of the tool tip of each node n be represented by $n^x=\{x, y, z\}$ (position representation), and $n^q=\{q_x, q_y, q_z, q_w\}$ (orientation representation using quaternion) of the tool tip. Also, let the joint space configuration of n be represented by $n^\Theta=\{\theta_1, \ldots, \theta_n\}$. In some embodiments, the Fast Marching Method (FMM) is used for estimation of the cost-to-go in 3D (x, y, z) workspace. For a given goal node $n_{goal}$, 3D FMM of the entire workspace is precomputed. Let FMM(n) be the shortest path distance from the node n to $n_{goal}$ in 3D workspace. Also, let $Q(n)=2\cos^{-1}(|n^q \cdot n_{goal}^q|/(|n^q||n_{goal}^q|))$ be the difference in the orientation of the tool tip between the current n and the goal $n_{goal}$ node. Now, the workspace guiding heuristics can

---

Algorithm 1 CODES3 Algorithm($\Theta_{start}$, $\Theta_{goal}$, GH, MP, $t_{max}$)

```
1:   InitializeDataStructs (Θ_start, Θ_goal, GH, MP) {GH is the list of all the Guiding
     Heuristic Functions. MP is the list of all the motion primitive. PQ is the list of all
     the priority queues. The size of PQ is the same as GH, and each queue PQ_i ∈ PQ
     sorts the nodes according to the cost function GH_i. HIST is the database containing
     the list of the last n expanded nodes. CLOSED stores the list of all the expanded
     nodes.}
2:   While t_elapsed < t_max do
3:       gh_id ← SelectGH(GH, HIST, COL)
4:       n_curr ← GetNextBestNode(PQ, HIST, gh_id)
5:       if ReachedGoal(n_curr) then
6:           τ ← ReconstructPath (n_curr)
7:           return τ
8:       end if
9:       HIST ← HIST ∪ n_curr
10:      if n_curr ∈ CLOSED then
11:          continue
12:      else
13:          CLOSED ← CLOSED ∪ n_curr
14:      end if
15:      COL ← RandomSampling(n_curr)
16:      P(n_curr) ← SelectMP(n_curr, MP, HIST, COL)
17:      n_children ← Expand(n_curr, P(n_curr), COL)
18:      for n_child in n_children do
19:          if n_child ∈ CLOSED then
20:              continue
21:          end if
22:          n_child parent ← GetParentByBT(n_curr)
23:          n_child g ← GCost(n_curr, n_start)
24:          for i ← {1, |GH|} do
25:              n_child h_i ← HCost(n_curr, n_goal, GH_i)
26:              PQ_i push (n_child h_i, n_child)
27:          end for
28:      end for
29:      flag_hmn ← IsHumanIPReq(HIST, COL)
30:      if flag_hmn then
31:          τ ← ComputeTrajUsingHumanIP(...)
32:          return τ
33:      end if
34:  end while
``` be calculated as $k^w(n) = w_1^{k,w} FMM(n) + w_2^{k,w} Q(n)$, where the weights $w_1^{k,w}$, and $w_2^{k,w}$ are used to normalize the cost function.

During the computation of guiding heuristics for configuration space $k^c(n)$, the time cost to move from the joint angle configuration of a node n to goal $n_{goal}$ is considered. Let v be the maximum attainable joint speed for the joint that needs to rotate most. Now, the heuristic function $k^c(n)$ can be computed as $k^c(n) = (\|n^\Theta - n_{goal}^\Theta\|_\infty)/v$. Finally, the cost-to-come to node n from start $n_{start}$ can be calculated as $g(n) = g(n.parent) + (\|n^\Theta - n^\Theta.parent\|_\infty)/v$, where n.parent is the parent node of the node n in the search tree. If n.parent=∅, then the value of $g(n) = 0$. The cost-to-come $g(n)$ is used as a part of the heuristic function and also to compute the execution cost of the computed trajectory.

Identification of Promising Nodes

In the graph search-based algorithm, each node n is pushed into a priority queue and selected to expand based upon the estimated promise computed by a single heuristic function h(n). However, a single function is unable to guide the search throughout the entire workspace. The algorithm described herein dynamically updates the evaluation function that is used to select the frontier node.

A set of n heuristic functions $h_i(n) \in GH$ is defined, where $i \in \{1, n\}$, and GH is the set of all heuristic functions. Each heuristic function $h_i(n)$ is generated by varying weights $w_1$, $w_2$, and $w_3$ of the cost function f(n). A set of n priority queues $PQ_i \in PQ$ is also defined, each sorting the nodes with respect to heuristic function $h_i(n) \in GH$.

The heuristic selection for different regions in the workspace is achieved by maximizing the effectiveness of each heuristic with respect to congestion in the configuration space (line 3 Alg. 1, SelectGH). The search starts with an initial estimation of configuration space around the start node and selects to use heuristics gh_id that might be best for the regions around the start node.

Figure 5A:
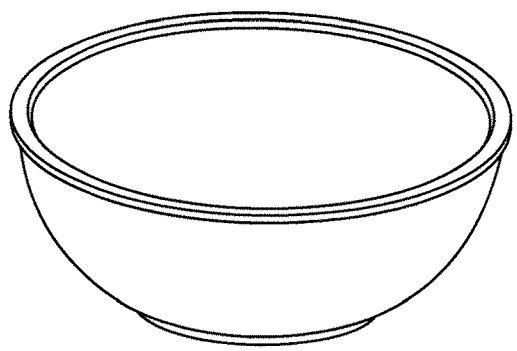
FIGS. 5A-5F illustrate the 3D models of six parts used in the experiments to test the performance of the systems and methods described herein, according to various embodiments of the invention.
Figure 5B:
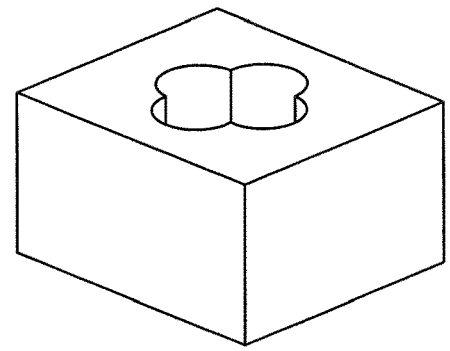
Figure 5C:
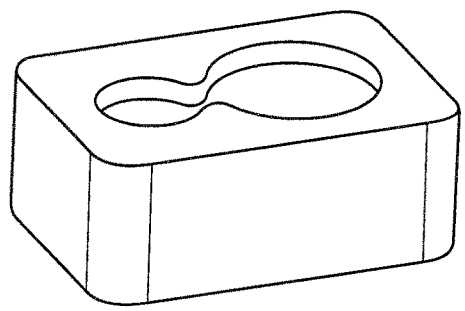
Figure 5D:
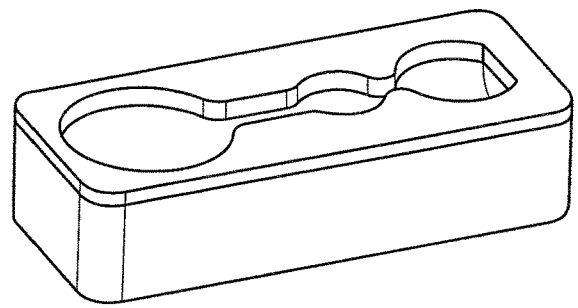
Figure 5E:
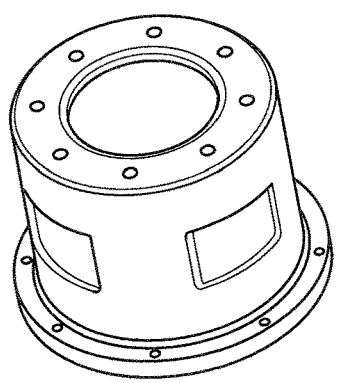
Figure 5F:
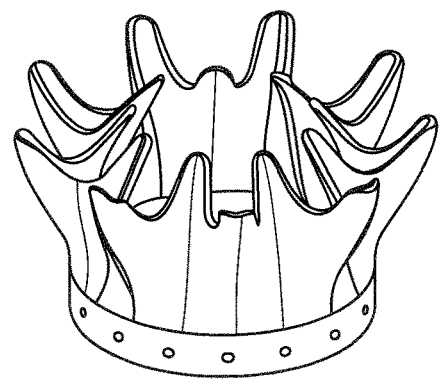
Figure 10A:
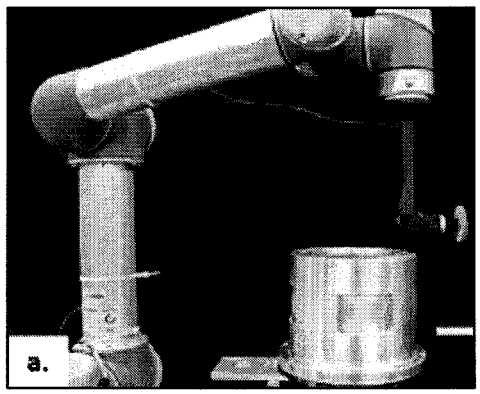
FIGS. 10A-10D show the images of UR5 and iiwa7 executing computed trajectories, according to various embodiments of the invention.
Figure 10B:
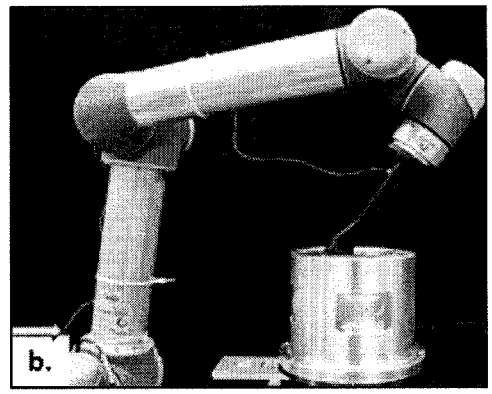
Figure 10C:
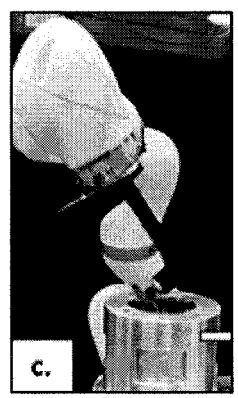
Figure 10D:
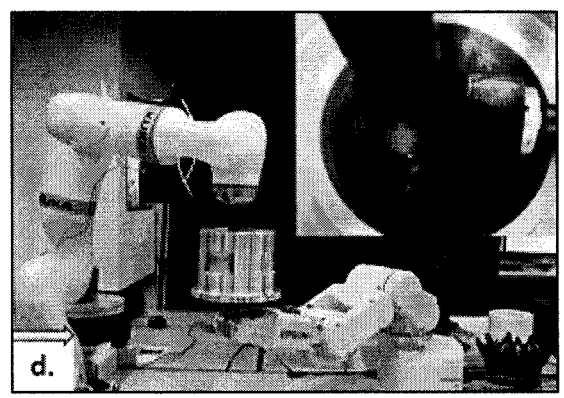

Here, gh_id is just the index of the heuristic. For example, if the start node is lying inside the concavity of the hollow part (e.g., Part 2 shown in FIG. 5B), then it is beneficial to use a heuristic function that puts higher weights on $k^w(n)$ as compared to $k^c(n)$. This is under the assumption that the FMM values will be able to navigate the tool tip inside the part without getting stuck in local concavities. Further, the heuristics are also switched for the next best heuristic if the selected heuristic gh_id is not making progress towards the goal. Once the heuristic is selected, the top-most node of the priority queue corresponding to gh_id is selected for expansion.

The progress towards the goal is measured by calculating mean change in the heuristic cost over the last n nodes (HIST in Alg. 1). If the mean change in heuristic cost is below a threshold $\varepsilon_{h,i}$, then the heuristic is switched for the next best heuristic function. Also, the estimation of congestion in configuration space helps to select the right heuristic. This is achieved by sampling the configuration space, selecting a set of sampled points around the vicinity of the previous node $n_{prev}$, and performing principal component analysis (PCA) on the configurations (samples) that are colliding and collision free. The sampling of the configuration space is performed in parallel to the search algorithm. From the principle components, both in configuration space and workspace, which direction in the configuration space is relatively free and by what scale may be locally identified. During the search, each node queries in the sampling thread for the estimated congestion values around that node (see line 15 in Alg. 1).

Pruning of Nodes in Bottleneck Region

Despite using several heuristics, there will be areas of the workspace where the search progress towards the goal is minuscule. However, given enough time, the search will converge and reach the goal. These regions of workspace where the progress of the search is hindered are referred to as bottleneck regions. In these regions, the search tree has a large number of nodes with marginal change in heuristic cost as compared to the previously expanded nodes. The search algorithm spends a large amount of computational resources by sequentially evaluating the next best nodes and eventually expanding nodes that can lead the search out of the bottleneck region. In order to improve the computational performance of the algorithm, a cost l(n) in the heuristic function h(n) estimates the diversity of the expanded node. The diversity of a node is used to prune branches of the search tree that have joint configurations that are marginally different from the current node. This cost is added to the cost function $h(n_{curr})$ after the node is popped out of the priority queue $PQ_{gh\_id}$ and the new cost is evaluated to determine if the node is diverse and should be expanded.

The region is considered to be the bottleneck region if the maximum of the mean change in the heuristic cost over all the heuristics in GH is less than $\varepsilon_l$. Further, the cost $l(n_{curr})$ is computed by taking the normalized distance to the previously expanded node $n_{prev}$. The weight $w_4$ associated with the cost function l(n) in heuristic cost function h(n) is kept negative. Thus, it discounts the cost $h(n_{curr})$, compares it with the heuristic cost $h(n_{prev})$ of the previously expanded node, and if $h(n_{curr}) < h(n_{prev})$, then the node is evaluated. The cost $l(n_{curr}) = 0$ in the areas other than the bottleneck regions.

Human Aid to Guide Search

The algorithm prompts the human for an input when the designed heuristic functions are unable to guide the search. The algorithm computes the mean change in heuristic value for all the heuristic functions GH. If it drops below a constant threshold $\varepsilon_{human,h}$ and the change in joint configuration of the selected nodes drops below $\varepsilon_{human,j}$, then the human is notified. The user evaluates the progress of the search and determine the constriction region in the workspace. The user is expected to select an intermediate waypoint $n_{interim}^\Theta$ to circumnavigate the constriction region. These intermediate waypoints are used as $n'_{start}$ and $n'_{goal}$ for two new instance calls to Alg. 1 which compute the paths independently and combine them to get the complete path from start to goal node.

Context Dependent Selection and Scaling of Primitives

Figure 4:
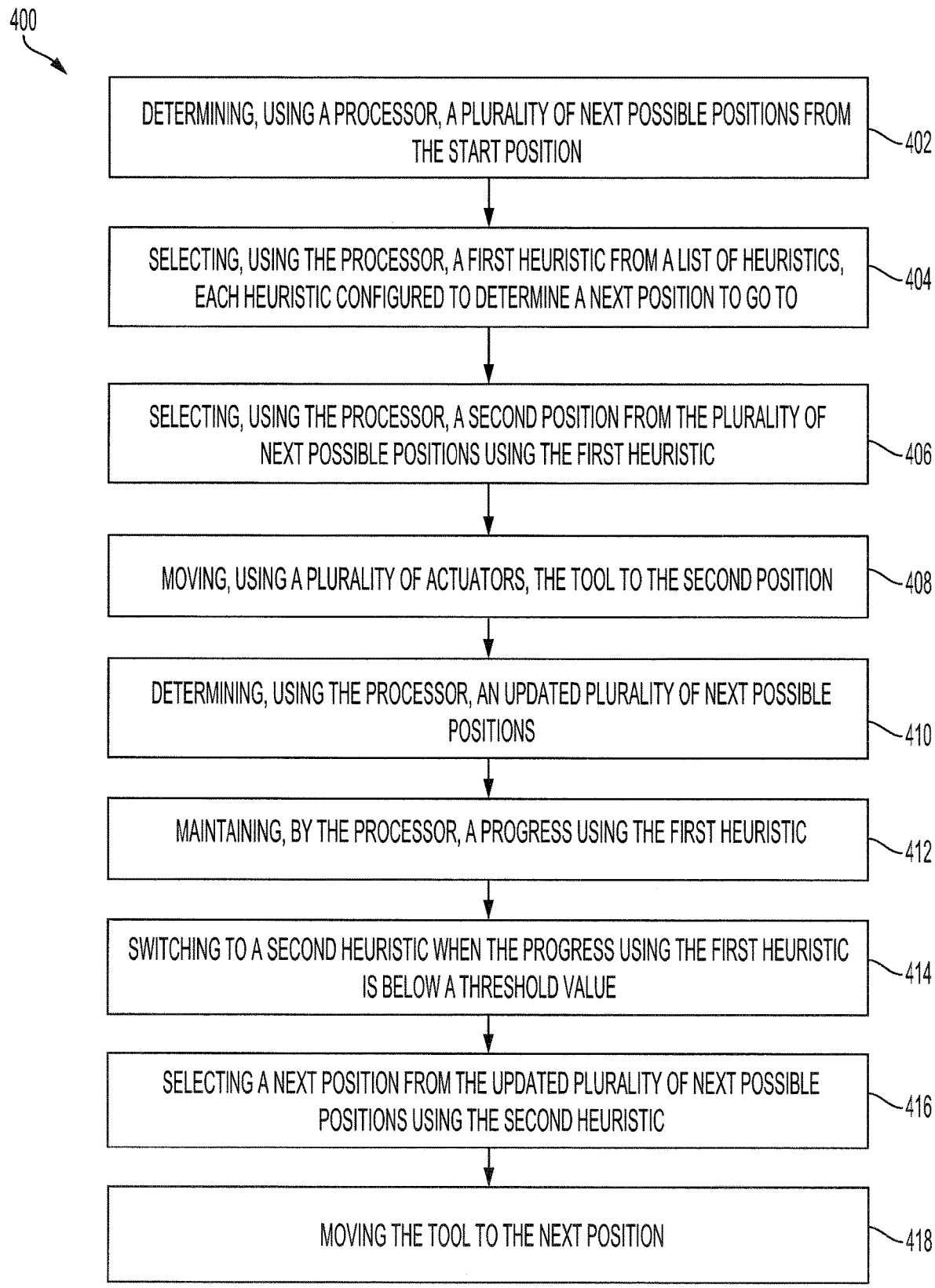
FIG. 4 illustrates a process of the methods, according to various embodiments of the invention.

Two distinct sets of motion primitives are generated (as described with respect to step 402 of FIG. 4). The first set contains motion primitives that move one joint of the robot at a time in the configuration space and is termed as $P^c \in MP$. The second set contains motion primitives that move the tool tip of the robot in 6D workspace (x, y, z, α, β, γ) and termed as $P^w$. The IK solution is used to convert the workspace motion primitives into joint configurations.

The search starts with an initial estimation of the congestion around the start node and selects the appropriate set of motion primitives corresponding the congestion value. The congestion value is obtained by querying the sampling thread for the estimated congestion value around the current node $n_{curr}$. Similar to the selection of heuristic cost function, a PCA was performed on the sampled collision-free states around the current node $n_{curr}$ and evaluate the free space in different directions of the workspace and configuration space. The principle components in the workspace can be used to identify which directions of the workspace are locally free. Similarly, the principle components in configuration space is used to identify which joints has more room for movement in the local neighborhood. Further, the primitive set that had the most free space around current node was selected. This method of selection of primitive might not be advantageous in scenarios where the generated child node does not minimize the selected heuristic function h(n). Thus, the history (HIST) of the previously expanded nodes by each set of primitives is considered and the effectiveness of each set is determined.

In experiments performed using the systems and methods described herein, it was observed that the workspace-based motion primitives $P^w$ works better in the interior regions of the parts as compared to the configuration-based heuristic $P^c$. However, when the search reaches the bottleneck regions it is beneficial to search in configuration space primitives $P^c$.

In the systems and methods described herein, not only are different sets of motion primitives used, but also the length of the primitives is dynamically scaled by considering the congestion around the current node $n_{curr}$. The length of the motion primitives is determined by performing binary search in the bounds provided for the selected dimension. For example, the motion primitives that are generated by varying the x component of the pose would be $(x \pm \delta_x, y, z, \alpha, \beta, \gamma)$. Here, the value of the $\delta_x$ is determined by performing binary search within bound $[\delta_{min}^{n,x}, \delta_{max}^{n,x}]$. The bounds $\delta_{min}^{n,x}$, and $\delta_{max}^{n,x}$ are determined by the congestion values around the node n.

Backtracking and Trajectory Repair

The backtracking feature directly connects nodes in the search tree by combining several motion primitives. This is implemented by evaluating collision free path between the new child node, $n_{child}$ and n-step parent nodes of the current node, $n_{curr}$ (see line 22, alg. 1). The ith parent node of $n_{curr}$ is defined as $n_{curr}.parent_i$, $i=1, \ldots, n$, where $n_{curr}.parent_1 = n_{curr}.parent$, $n_{curr}.parent_2 = (n_{curr}.parent).parent$, and so on.

The process begins from the furthest parent (i=n) to evaluate collision free path and keep on reducing i until i=1. If the combined motion from the ith parent node to the child node is collision free, then the child $n_{child}$ is directly connected to the $n_{curr}.parent_i$. Thus, the time cost $g'(n_{child}) = g_{n_{curr}.parent_i} + (\|n_{child}^{\ominus} - n^{\ominus}.parent_i\|\infty/v$ and is guaranteed to be less than or equal to the $g(n_{child})$. The higher the value of n, the lower the trajectory execution cost, but the higher the computation time of the search.

Figure 3:
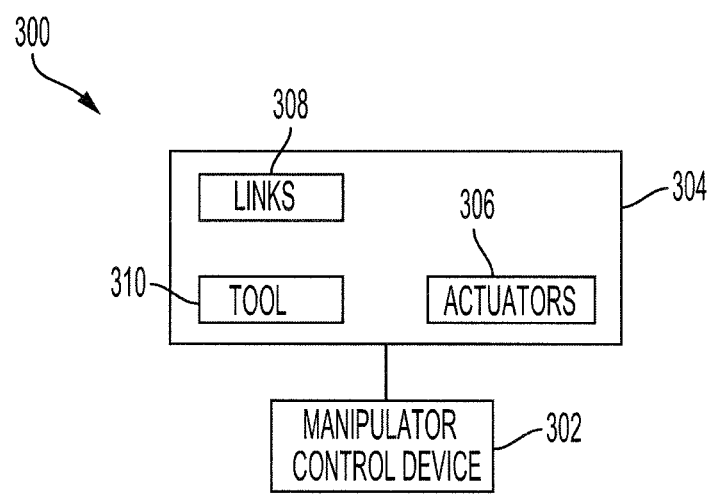
FIG. 3 illustrates the trajectory determination system, according to various embodiments of the invention.

FIG. 3 illustrates the trajectory determination system according to various embodiments. The system 300 includes a manipulator control device 302 connected to a manipulator 304 (e.g., manipulator 102).

The manipulator control device 302 is configured to determine instructions for moving the manipulator 304 and is configured to communicate the instructions to the manipulator 304, causing the manipulator 304 to move. The manipulator control device 302 may include a processor, an input unit, a non-transitory memory, and a display. The processor may be one or more computer processing devices capable of performing instructions stored on the non-transitory memory. The input unit is configured to receive input from a user. For example, the input unit may be a keyboard, a mouse, a microphone, or a touchscreen. The non-transitory memory is configured to store any data described herein. The display is configured to display progress of the manipulator or indications to the user, such as when the user should intervene.

The manipulator 304 includes links 308 that are connected by joints. At the end of the links 308 is a tool 310 (e.g., tool 104) that is moved from the start location to the goal location. The actuators 306 of the manipulator 304 move the links 308 in accordance with the instructions received from the manipulator control device 302. In some embodiments, the manipulator control device 302 is an integrated part of the manipulator 304. In some embodiments, the manipulator control device 302 is separate from the manipulator 304, but is communicatively connected to the manipulator 304 via a data transfer connection (e.g., cable or respective transceivers) and using a data transfer protocol.

FIG. 4 illustrates a process 400 of the methods described herein. The process involves a robotic manipulator (e.g., manipulator 304) having a tool (e.g., tool 310) at a start position. The process 400 aims to automatically move the tool to a goal position.

A processor (e.g., processor of manipulator control device 302) determines a plurality of next possible positions from the start position (step 402). The plurality of next possible positions may be determined using a set of motion primitives (i.e., possible moves that may be made from the current position). Which motion primitive to use may be determined based on a congestion surrounding the start position.

The processor selects a first heuristic from a list of heuristics (step 404). Each heuristic from the list of heuristics evaluates a cost associated with moving the tool from the start position to the current position. The first heuristic is chosen based on an initial estimation of the configuration space around the start position. The list of heuristics may be determined by varying the weights of the cost function f(n) described herein.

The processor selects a second position from the plurality of next possible positions using the first heuristic (step 406). The first heuristic may be a version of the dynamic heuristic function h(n) described herein, where the dynamic heuristic function may have many variants based on different weight values.

A plurality of actuators (e.g., actuators 306) are used to move the tool to the second position (step 408). The tool may be moved by a certain distance. The distance may be determined using an estimate of congestion around the tool—when there is more free space around the tool, the tool is moved a greater distance than if there is less free space around the tool. The estimate of congestion may be made by sampling the space around the current position to determine whether a collision occurs. In some embodiments, the robotic manipulator includes a sensor to detect when a collision has occurred.

The processor determines an updated plurality of next possible positions (step 410). Again, the processor uses the set of motion primitives to determine the updated plurality of next possible positions. There may be more than one set of motion primitives, and which set of motion primitives to use is determined by keeping track of the change in next position from the previous position. For example, if the manipulator is stuck and making small steps only, the set of motion primitives is replaced with another set of motion primitives.

The processor maintains a progress made using the first heuristic (step 412). The progress may be determined based on the mean change in heuristic cost over a past n positions (i.e., a moving average). The value n may be predetermined or may be dynamically changing based on the overall progress toward the goal configuration.

The processor switches to a second heuristic when the progress using the first heuristic is below a threshold value (step 414). The threshold value may be predetermined or may be dynamically changing. In an example situation, the first heuristic may be a workspace heuristic when the tool is located in an open area, as the workspace heuristic may be better suited for movement in open areas, but when the tool moves closer to congested areas, the processor may automatically switch to a second heuristic with is a configuration space heuristic, which is better suited for congested areas.

The processor selects a next position from the updated plurality of next possible positions using the second heuristic (step 416). The actuators then move the tool to the next position (step 418). The steps 410-418 may be repeated until the tool is at the goal position.

Experimental Results

Experiments using the systems and methods described herein were performed. In the experiments, the application of robotic surface finishing of complex internal regions was considered. In the experiments, the robot needed to guide a tool inside a complex and constrained geometry to finish internal surfaces. FIGS. 5A-5F illustrate the 3D models of six parts (parts 1-6, respectively) used in the experiments to test the performance of the systems and methods described herein (e.g., CODES3). The complexity of the test parts increased from 5A-5D (parts 1-4). Parts 5-6 (shown in FIGS. 5E-5F) were used for physical experiments. Multiple start-end configurations of the robot were considered for each part. The test scenarios also included cases where both the start and end configuration required the tool to be inside the part. For simplicity, the test scene will be referred to as part 1, case a as scenario 1a and so on. The algorithm was tested in simulation (using UR5 robot) and physical experiments (using UR5 & KUKA iiwa7 robots).

The algorithm was implemented using MATLAB on a computer with an Intel Xeon 3.50 GHz processor and 32 GB of RAM. The grid resolution of 1° was considered for configuration space, and 0:01 meters for workspace. The maximum planning time for each scenario was kept to be $t_{max}$=5 hours.

The method was benchmarked against RRT-Connect, Best First Search (BFS), and Anytime A* (ARA*) in the simulation experiments. ARA* was selected instead of A* for comparison due the poor computation performance of A* in its vanilla implementation. The cost function used for ARA* is $f(n)=g(n)+\varepsilon k^c(n)$, where $\varepsilon=5$ was used as inflation factor. The cost function used for the BFS was $f(n)=k^c(n)$. The motion primitives set used for ARA*, and BFS consists of +1° motion for each joint of the robot. ARA* has better computation time in few scenarios as compared to BFS. This is mainly due to the skewed cost function of ARA* which involves g and inflated h terms as compared to just the h term in the case of BFS. Moreover, the results presented for RRT-Connect, BFS, and ARA* in FIG. 6 can be further be improved by tuning the planning parameters for each part. The purpose of these comparisons was to assess relative merit of each methods across parts, therefore tuning of parameters was not attempted to improve performance on individual parts.

In the experiments, the range of scalable configuration space primitives $P^c(n)$ was ±[1°; 20°] and the range of workspace primitives $P^w(n)$ was ±[0:01, 0:15] meters for [x, y, z], and ±[1°; 20°] for [α, β, γ] (Euler angles). The joint velocity used by the cost function g(n) and $k^c(n)$ was kept to be 1 rad/sec. The weights $\varepsilon_{h,i}$ for both the heuristic function were kept constant at 0.01. The immediate parent (n=1) was used for backtracking. Finally, the FK and IK were analytically computed for UR5 robot.

FIG. 6 shows the comparisons among the methods in computation time, node expansion, and trajectory execution time. The cells marked with 'N/S' represents the cases where the planners were not able to generate solution within time bound $t_{max}$. The method performed equivalently on the parts with simple geometries and significantly better in the cases where the parts have complex geometries. None of the methods except the method described herein were able to find a solution for scenarios 4c-4e. Further, the algorithm was not able to compute trajectory for scenario 4e.

The search performance was also compared (see FIG. 7) by introducing each feature and compared its performance with the baseline. The baseline method 1 (M1) presented in the table searches using scalable workspace primitives Pw(n) and cost function h(n) with weights [$w_1$, $w_2$, $w_3$, $w_4$]=[0, 0, 1, 0]. Each feature added in methods 2-4 is an addition to the previous method. Method 2 (M2) uses a hybrid set of primitives Pc(n) and Pw(n) along with weights of the cost functions [$w_1$, $w_2$, $w_3$, $w_4$]=[0, 1, 1, 0]. Method 3 (M3) uses a hybrid set of primitives along with pruning nodes using diversity, condition and the weights of the cost functions [$w_1$, $w_2$, $w_3$, $w_4$]=[0, 1, 1, 1]. Finally, Method 4 (M4) is an extension to M3 with the backtracking feature.

In the cases with simple parts (e.g., part 2) the computation time of all the methods were similar. However, the method M4 is able to generate trajectories with low execution cost and a minor increase in computational time. This is primarily due to the backtracking feature which combines motions associated with multiple nodes into a single motion that leads to lower execution cost. Further, there are a large number of cases where M1 have significantly large computation time as compared to M2. This is because the workspace cost function is not able to guide the orientation of the tool.

Also, M1 is unable to compute a path for scenario 5b. This is because the tool reaches the goal configuration in position, however the robot requires a large flip in one of the joint angles in order to achieve the goal orientation and the cost function $k^w(n)$ is unable to guide the search. This is improved in M2 which solves the same case (5b) in just 10 sec.

The method M3 performs the same as M2 in several scenarios where there were no bottleneck regions encountered (see FIG. 7). However, in the few scenarios like 3c-3e there were bottleneck regions encountered between start to goal state. These scenarios where mainly going from large hole region of part 3 (see FIG. 5C) to small hole region (3c,3d), and coming out of part from the small hole region (3e). In such scenarios, the algorithm invests a lot of time expanding the nodes with minor change in joint configuration, therefore the diversity condition helps to reduce the number of expanded nodes and reduces the computation time by approximately 50-60% with respect to M2 in scenarios 3c-3e, and 4b. Finally, method 4 (M4) on an average reduces the trajectory execution time by approximately 40%. However, due to extra collision checks to determine connectivity with the parent, there is a marginal increase in computation time.

Among the test scenarios, scenario 4e was unsolved and the computation time of scenario 3e was high. In these scenarios the human input feature was activated, where the human provides an intermediate configuration between the start and the goal node. FIGS. 9A-9C show the start, goal, and intermediate configuration of the robot for scenario 4e. Part 4 is designed such that the tool cannot pass through the channel between the start and goal states (as illustrated in FIG. 1). In this example, the heuristic functions will misguide the search and the planner will not converge to a solution. However, when the planner gets additional input in the form of an intermediate configuration then the heuristic function is able to guide the search easily from the start to goal via the intermediate node. FIG. 8 shows the computation time and trajectory execution time for BFS and CODES3 with human input. The computation time and execution time have reduced significantly for scenario 3e.

Physical experiments were performed on part 5 and 6 using UR5 (6DOF) and KUKA iiwa7 (7DOF) robots. These two robots are significantly different by design. The design on UR5 separate the wrist joints (last three) from the base, shoulder, and elbow joints (first three). This separation allows the planning algorithm to decouple the two sets of joints and plan independently. On the other hand, all the joints of iiwa7 are equally coupled. Therefore, the specialized algorithms developed for robots with independent wrist joints cannot be used for iiwa7. The context dependent search strategy switching enables the method to be independent of the robot geometry. FIGS. 10A-10D show the images of UR5 and iiwa7 executing computed trajectories. The computation time for iiwa7 in scenario 5a is 1300.6 sec, however out of which 1247.2 sec is taken up by numerical IK solver in MATLAB robotics toolbox. Therefore, the planning time comes down to 53.4 sec.

Similarly, the computation time for scenario 6a is 167.6 sec out of which 133.5 sec for computation of numerical IK. In future, TracIK may be integrated for faster computation of numerical IK. The preliminary experiments indicate that it will reduce the computation time by 10 to 100 fold.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A method for automatically moving a tool attached to a robotic manipulator from a start position to a goal position, the method comprising:
   determining, using a processor, a plurality of next possible positions from the start position;
   selecting, using the processor, a second position from the plurality of next possible positions based on respective costs associated with moving the tool from the start position to each of the possible positions in the plurality of next possible positions, the selecting of the second position being based on a determination of whether to use a first heuristic or a second heuristic;
   moving, using a plurality of actuators, the tool to the second position; and
   determining, using the processor, an updated plurality of next possible positions, selecting a next position from the updated plurality of next possible positions based on respective costs associated with moving the tool from the start position to each of the possible positions in the updated plurality of next possible positions, and moving the tool to the next position until the goal position is reached.

2. The method of claim 1, wherein the plurality of next possible positions and the updated plurality of next possible positions are determined using a motion primitive, the motion primitive chosen from a plurality of possible motion primitives based on a freedom of motion of the robotic manipulator.

3. The method of claim 1, wherein the first heuristic is a configuration space heuristic or a workspace heuristic and the second heuristic is an other of the configuration space heuristic or the workspace heuristic,
   wherein the configuration space heuristic guides selection in configuration space, and
   wherein the workspace heuristic guides selection in workspace.

4. The method of claim 3, wherein selecting the second position from the plurality of next possible positions is further based on a diversity function indicating a diversity of next positions of each of the next possible positions.

5. The method of claim 3, wherein an estimated cost of moving from the current position to the goal position in workspace is based on a distance cost associated with moving from the current position to the goal position in workspace and a rotational cost associated with moving from the current position to the goal position in workspace.

6. The method of claim 3, further comprising maintaining, by the processor, a progress using the first heuristic, the progress being determined by based on at least a moving average of heuristic cost; and
   switching to the second heuristic to determine the cost associated with moving the tool when the progress using the first heuristic is below a threshold value, the second heuristic being the configuration space heuristic when the first heuristic is the workspace heuristic, or the second heuristic being the workspace heuristic when the first heuristic is the configuration space heuristic.

7. The method of claim 6, further comprising switching to the second heuristic based on a freedom of motion of the robotic manipulator.

8. The method of claim 1, wherein an amount the tool is moved is determined based on congestion surrounding a current position of the tool, the amount being larger as the congestion surrounding the current position of the tool is higher, and the amount being smaller as the congestion surrounding the current position of the tool is lower.

9. A system for automatically moving a tool attached to a robotic manipulator from a start position to a goal position, the system comprising:
   a processor configured to:
      determine a plurality of next possible positions from the start position,
      select a second position from the plurality of next possible positions based on respective costs associated with moving the tool from the start position to each of the possible positions in the plurality of next possible positions, the selecting of the second position being based on a determination of whether to use a first heuristic or a second heuristic, and
      determine an updated plurality of next possible positions and select a next position from the updated plurality of next possible positions based on respective costs associated with moving the tool from the start position to each of the possible positions in the updated plurality of next possible positions until the goal position is reached; and
   a plurality of actuators configured to move the tool to the second position, the next position, or the goal position.

10. The system of claim 9, wherein the plurality of next possible positions and the updated plurality of next possible positions are determined by the processor using a motion primitive, the motion primitive chosen from a plurality of possible motion primitives based on a freedom of motion of the robotic manipulator.

11. The system of claim 9, wherein the first heuristic is a configuration space heuristic or a workspace heuristic and the second heuristic is an other of the configuration space heuristic or the workspace heuristic,
   wherein the configuration space heuristic guides selection in configuration space, and
   wherein the workspace heuristic guides selection in workspace.

12. The system of claim 11, wherein selection of the second position from the plurality of next possible positions by the processor is further based on a diversity function indicating a diversity of next positions of each of the next possible positions.

13. The system of claim 11, wherein an estimated cost associated with moving from the current position to the goal position in workspace is based on a distance cost associated with moving from the current position to the goal position in workspace and a rotational cost associated with moving from the current position to the goal position in workspace.

14. The system of claim 11, wherein the processor is further configured to:
   maintain a progress using the first heuristic, the progress being determined based on at least a moving average of heuristic cost and
   switch to the second heuristic to determine the cost associated with moving the tool when the progress using the first heuristic is below a threshold value, the second heuristic being the configuration space heuristic when the first heuristic is the workspace heuristic, or the second heuristic being the workspace heuristic when the first heuristic is the configuration space heuristic.

15. The system of claim 14, wherein the processor is further configured to switch to the second heuristic based on a freedom of motion of the robotic manipulator.

16. The method of claim 9, wherein the processor is further configured to determine an amount the tool is moved based on congestion surrounding a current position of the tool, the amount being larger as the congestion surrounding the current position of the tool is higher, and the amount being smaller as the congestion surrounding the current position of the tool is lower.

17. A method for automatically moving a tool attached to a robotic manipulator from a start position to a goal position, the method comprising:
   determining, using a processor, a plurality of next possible positions from the start position using a motion primitive, the motion primitive chosen from a plurality of possible motion primitives based on a freedom of motion of the robotic manipulator;
   selecting, using the processor, a second position from the plurality of next possible positions based on respective costs associated with moving the tool from the start position to each of the possible positions in the plurality of next possible positions, the selecting of the second position being based on a determination of whether to use a first heuristic or a second heuristic;
   moving, using a plurality of actuators, the tool to the second position; and
   determining, using the processor, an updated plurality of next possible positions, selecting a next position from the updated plurality of next possible positions based on respective costs associated with moving the tool from the start position to each of the possible positions in the updated plurality of next possible positions, and moving the tool to the next position until the goal position is reached.

18. The method of claim 17, wherein the first heuristic is chosen from plurality of heuristics, each heuristic in the plurality of heuristics being a weighted combination of a configuration space heuristic, a workspace heuristic, and/or a diversity function,
   wherein the configuration space heuristic guides selection in configuration space,
   wherein the workspace heuristic guides selection in workspace, and
   wherein the diversity function indicates a diversity of next positions of each of the next possible positions.

19. The method of claim 18, wherein an estimated cost associated with moving from the current position to the goal position in workspace is based on a distance cost associated with moving from the current position to the goal position in workspace and a rotational cost associated with moving from the current position to the goal position in workspace.

20. The method of claim 18, further comprising maintaining, by the processor, a progress using the first heuristic, the progress being determined based on at least a moving average of heuristic cost; and
   switching to the second heuristic from the plurality of heuristics to determine the cost associated with moving the tool when the progress using the first heuristic is below a threshold value.

* * * * *